(12) United States Patent
Yamada et al.

(10) Patent No.: US 7,959,886 B2
(45) Date of Patent: Jun. 14, 2011

(54) MIXED-LAYERED PHYLLOSILICATE AND PROCESS FOR PRODUCING THE SAME

(75) Inventors: Hirohisa Yamada, Ibaraki (JP); Kenji Tamura, Ibaraki (JP); Shingo Yokoyama, Ibaraki (JP)

(73) Assignee: National Institute for Materials Science, Tsukuba-shi (JP)

( * ) Notice: Subject to any disclaimer, the term of this patent is extended or adjusted under 35 U.S.C. 154(b) by 610 days.

(21) Appl. No.: 12/066,743

(22) PCT Filed: Sep. 13, 2006

(86) PCT No.: PCT/JP2006/318143
§ 371 (c)(1),
(2), (4) Date: Mar. 13, 2008

(87) PCT Pub. No.: WO2007/032380
PCT Pub. Date: Mar. 22, 2007

(65) Prior Publication Data
US 2009/0233107 A1 Sep. 17, 2009

(30) Foreign Application Priority Data
Sep. 14, 2005 (JP) .................. 2005-267709

(51) Int. Cl.
*C01B 33/38* (2006.01)
*C08K 9/04* (2006.01)
*C08L 101/00* (2006.01)

(52) U.S. Cl. .................. 423/326; 423/327.1; 423/328.1; 423/331

(58) Field of Classification Search .................. 423/326, 423/327.1, 328.1, 331
See application file for complete search history.

(56) References Cited

U.S. PATENT DOCUMENTS

| | | | |
|---|---|---|---|
| 4,757,040 A | 7/1988 | Guan et al. | |
| 5,595,716 A | 1/1997 | Torii et al. | |
| 5,993,769 A | 11/1999 | Pinnavaia et al. | |
| 7,485,686 B2 * | 2/2009 | Yamamoto et al. | 526/160 |
| 2003/0099815 A1 | 5/2003 | Dontula et al. | |
| 2007/0259992 A1 | 11/2007 | Tamura et al. | |

FOREIGN PATENT DOCUMENTS

| | | |
|---|---|---|
| JP | 62-256717 A | 11/1987 |
| JP | 8-59226 A | 3/1996 |
| JP | 9-235116 A | 9/1997 |
| JP | 9-268010 A | 10/1997 |
| JP | 2003-512276 A | 4/2003 |
| JP | 2003-221225 A | 8/2003 |
| JP | 2004-248134 A | 9/2004 |
| JP | 2005-225743 A | 8/2005 |
| WO | WO 2004016661 A1 * | 2/2004 |

OTHER PUBLICATIONS

G. W. Brindley et al; "Crystal Structures of Clay Minerals and Their X-Ray Identification," Mineralogical Society Monograph No. 5; London 1980; pp. 249-303.

* cited by examiner

Primary Examiner — Kelechi C Egwim
(74) Attorney, Agent, or Firm — Westerman, Hattori, Daniels & Adrian, LLP

(57) ABSTRACT

A new mixed layer silicate useful for industrial materials is provided.

The mixed layer silicate is obtained by a specific synthesis method. The mixed layer silicate includes non-swelling 2:1 type layered silicate layers having a layer charge of 0 or non-swelling 2:1 type layered silicate layers having a layer charge of 0.6 to 1 and including potassium ions between layers and swelling 2:1 type layered silicate layers having a layer charge of 0.2 to 0.6 and including exchangeable cations between layers. The mixed layer silicate has a structure in which individual layers are laminated in a regular order in a lamination direction (regularly mixed layer structure). Furthermore, an organic-inorganic composite material is prepared through intercalation of a positive charge organic compound into the swelling 2:1 type layered silicate layers in the resulting mixed layer silicate, and the resulting organic-inorganic composite material is swollen and peeled in a polymer, so that a polymer composite material in which silicate sheet sets, each set including a few silicate sheets, are homogeneously dispersed in the polymer can be obtained.

15 Claims, 3 Drawing Sheets

MIXED-LAYERED PHYLLOSILICATE AND PROCESS FOR PRODUCING THE SAME

TECHNICAL FIELD

The present invention relates to a synthetic mixed layer silicate including smectite and talc or pyrophillite as constituent layers and a process for producing the same.

BACKGROUND ART

Mixed layer silicates typified by clay minerals and mica minerals are classified in detail on the basis of the constituent elements and the layer charges thereof. The basic structure of the layers of layered silicate is primarily composed of a tetrahedral sheet and an octahedral sheet. In the tetrahedral sheet, tetrahedrons in which four $O^{2-}$ coordinate with a metal, e.g., silicon or aluminum, are bonded into a hexagonal network shape so as to form a sheet. In the octahedral sheet, octahedrons in which six $OH^-$ or $O^{2-}$ coordinate with a trivalent, divalent, or monovalent metal, e.g., aluminum, magnesium, or lithium, are joined sharing edges. This tetragonal sheet and the octagonal sheet are joined sharing apex oxygen. A layer in which one tetrahedral sheet is bonded to one octahedral sheet is referred to as a 1:1 layer, and a layer in which tetrahedral sheets are bonded to both sides of one octahedral sheet is referred to as a 2:1 layer.

Smectite having a 2:1 layer falls roughly into di-octahedral smectite and tri-octahedral smectite. In many cases, trivalent aluminum is present in the octahedral sheet in the former, and divalent magnesium is present in the latter. Regarding each of them, if a shortage of positive charge occurs in the octahedral sheet or the tetrahedral sheet because of substitution with metals having different valences, the charge of the entire layer becomes negative. An absolute value of charge (negative) of a layer with reference to an ideal chemical composition is referred to as a layer charge. In order to keep a charge balance between layer charges, exchangeable cations are included between the layers. The names of minerals correspond thereto, and montmorillonite, beidellite, and the like are known as the di-octahedral smectite.

Saponite, hectorite, stevensite, and the like are known as the tri-octahedral smectite. Smectite is a fine particle clay mineral, and the layer charge per unit cell is within the range of 0.2 to 0.6. Specific properties, e.g., the ion exchange ability manifested from the layer charge, the swelling property, the dispersibility, and the intercalation function are exhibited. In contrast to other clay minerals, e.g., kaolinite to be used as a pottery pigment, smectite is used for special, industrial purposes, e.g., drilling mud, casting sand, organic smectite, and polymer-clay nanocomposite.

Likewise, examples of 2:1 layers having a layer charge of 0.6 to 1.0 include vermiculites; mica clay minerals typified by illite, sericite, glauconite, celadonite, and the like; and mica minerals typified by phlogopite, biotite, muscovite, palagonite, and the like. The crystallinity in directions of the a axis and the b axis is high and sheet area of each sheet is large as compared with a smectite crystal. However, nonexchangeable potassium ions are often included between the layers, and swelling property with water is not exhibited in contrast to smectite.

On the other hand, examples of 2:1 type layered silicates which do not manifest a layer charge structurally include talc in which magnesium has primarily substituted in an octahedral sheet and pyrophillite in which aluminum has substituted. They do not exhibit cation exchangeability. They do not swell nor disperse in water in contrast to smectite. Talc is a tabular crystal, and is industrially used as fillers for thermoplastic resins and the like for various purposes.

Among natural layered silicates, some layered silicates have structures in which unit structure layers of two or three types of clay minerals are laminated, and they are referred to as mixed layer minerals. Most of mixed layer minerals are generally mixed layer minerals composed of non-swelling layer/swelling layer. Regarding the naturally found mixed layer minerals having regularly laminated structure, for example, muscovite/smectite (montmorillonite), chlorite/smectite, mica/smectite, and talc/smectite (saponite) have been reported (Non-Patent Document 1).

Most of mixed layer minerals are specific materials having structures in which non-swelling layers and swelling layers are mixed and laminated and, therefore, have the properties of both layers in combination. It is expected that new high-performance materials are created by controlling this mixed layer structure. However, only a small amount of mixed layer minerals having uniform structures and good quality are naturally found. Therefore, development of uses for industrial materials is hardly considered.

On the other hand, some attempts to synthesize mixed layer silicates targeting for industrial use have been reported. For example, a synthetic mixed layer silicate including serpentine and smectite as constituent layers and a process for producing the same in which cations and, if necessary, fluorine ions are added to a composite hydrous oxide including silicon, magnesium, and aluminum as components so as to prepare a slurry and a hydrothermal reaction is conducted (Patent Documents 1 and 2), a mixed layer silicate including a fluorine containing mica-like structure portion and a talc-like structure portion and produced by heating a mixed fine powder containing an alkali metal selected from sodium and/or lithium, magnesium, silicon, oxygen, hydrogen, and fluorine as primary constituent elements at 700° C. to 1,200° C. and a process for producing the same (Patent Document 3), and the like have been reported.

The inventors filed an application for patent of the invention related to a nanocomposite having a high aspect ratio, which had not been reported previously, based on peeling of non-swelling mica having large crystal grains, which was a system not attempted previously (Patent Document 4). This is an attempt to research and develop a nanocomposite having a specific morphology by designing a layered silicate which becomes a dispersion phase. The mixed layer silicate of that invention is a characteristic inorganic layered substance in which swelling layers and non-swelling layers are laminated regularly, and a new nanocomposite can be produced by peeling and dispersion thereof.

Patent Document 1: Japanese Unexamined Patent Application Publication No. 8-59226
Patent Document 2: Japanese Unexamined Patent Application Publication No. 9-268010
Patent Document 3: Japanese Unexamined Patent Application Publication No. 9-235116
Patent Document 4: Japanese Patent Application No. 2004-
Non-Patent Document 1: Crystal structures of clay minerals and their X-ray identification, Edited by G. W. Brindley and G. Brown, Mineralogical Society, London, pp. 249-303, 1980.

DISCLOSURE OF INVENTION

Problems to be Solved by the Invention

Examples of applications of such a mixed layer silicate include an application to a layered silicate/polymer nanocomposite. Regarding the layered silicate/polymer nanocomposite, layers of the layered silicate having a swelling property are peeled on a one-by-one basis, and silicate layers having large aspect ratios are dispersed in a polymer matrix, so as to dramatically improve the dynamic properties and the gas barrier properties of the material. Much research and development have been conducted to make further excellent properties apparent. However, in most of the previously conducted research, specific swelling layered silicates, e.g., smectite, have been used and polymer materials have been changed.

Regarding the above-described fluorine-containing mixed layer silicate, various synthesis routes can be chosen. On the other hand, there is a fear of elution of fluorine from synthetic products. Therefore, uses thereof may be restricted. Accordingly, it is an object of the present invention to provide a new mixed layer silicate useful for the above-described various industrial purposes.

Means for Solving the Problems

The present inventors conducted intensive research on a new mixed layer silicate useful for industrial materials. As a result, it was made clear that a mixed layer silicate was able to be obtained by a specific synthesis method. The mixed layer silicate included non-swelling 2:1 type layered silicate layers typified by talc or pyrophillite and having a layer charge of 0 or non-swelling 2:1 type layered silicate layers typified by mica, illite, or vermiculite, having a layer charge of 0.6 to 1, and including potassium ions as interlayer cations and swelling 2:1 type layered silicate layers typified by smectite, having a layer charge of 0.2 to 0.6, and including exchangeable cations between layers. The mixed layer silicate had a structure in which individual layers were laminated in a regular order in a lamination direction (regularly mixed layer structure).

Furthermore, an organic-inorganic composite material was prepared through intercalation of a positive charge organic compound into the swelling 2:1 type layered silicate layers in the resulting mixed layer silicate, and the resulting organic-inorganic composite material was swollen and peeled in a polymer, so that a polymer composite material was able to be obtained, in which silicate sheet sets, each set including a few silicate sheets, were homogeneously dispersed in a polymer. The present invention has been completed on the basis of this finding.

The present invention provides a mixed layer silicate including 2:1 type layered silicate, which has a layer charge of 0, and smectite as constituent layers and having a regularly mixed layer structure not using fluorine raw material and a process for producing the same, as well as an organic-inorganic composite material and a polymer composite material, which include the mixed layer silicate.

That is, the present invention relates to a mixed layer silicate described in the following items [1] to [8], a process for producing a mixed layer silicate described in items [9] to [1,4], an organic-inorganic composite material described in items [1,5] and [1,6], and a polymer composite material described in items [1,7] and [18].

[1] A mixed layer silicate having a regularly mixed layer structure including 2:1 type layered silicate layers (A) having a layer charge of 0.2 to 0.6 and 2:1 type layered silicate layers (B) having a layer charge of 0.

[2] The mixed layer silicate having a regularly mixed layer structure according to the item [1], characterized in that the basic structure of the above-described 2:1 type layered silicate layer (A) having a layer charge of 0.2 to 0.6 is a smectite layer represented by General formula (1):

$$E_a[(M^1{}_bM^2{}_c)(Si_{4-d}Al_d)O_{10}(OH)_2]$$ [Chemical formula 1]

(where in the formula, $M^1$ and $M^2$ represent metal elements which enter octahedrons formed in a smectite structure, $M^1$ represents at least one of magnesium, iron, manganese, nickel, zinc, copper, cobalt, and lithium, $M^2$ represents at least one of aluminum, iron, manganese, and chromium, E represents an interlayer exchangeable cation selected from the group consisting of an alkali metal ion, an alkaline earth metal ion, a divalent heavy metal ion, a trivarent metal ion, an ammonium ion, and a hydrogen ion, and $0.2 \leq a \leq 0.6$, $0 < b \leq 3$, $0 < c \leq 2$, $0 < 2b+3c \leq 6$, and $0 \leq d < 4$ are satisfied).

[3] The mixed layer silicate having a regularly mixed layer structure according to the item [1], characterized in that the above-described 2:1 type layered silicate layer (B) having a layer charge of 0 is a talc-like layer represented by General formula (2):

$$(Mg_{3-e}M^3{}_e)(Si_{4-f}Al_f)O_{10}(OH)_2$$ [Chemical formula 2]

(where in the formula, $M^3$ represents one type of metal element selected from iron, aluminum, manganese, chromium, nickel, zinc, cobalt, titanium, calcium, sodium, and potassium and e and f represent numbers satisfying the relationships represented by $0 \leq e \leq 2$ and $0 \leq f \leq 1$).

[4] The mixed layer silicate having a regularly mixed layer structure according to the item [1], characterized in that the 2:1 type layered silicate layer (B) having a layer charge of 0 is a pyrophillite-like layer represented by General formula (3):

$$(Al_{2-g}M^4{}_g)(Si_{4-h}Al_h)O_{10}(OH)_2$$ [Chemical formula 3]

(where in the formula, $M^4$ represents one type of metal element selected from iron, magnesium, and titanium and g and h represent numbers satisfying the relationships represented by $0 \leq g \leq 1$ and $0 \leq h \leq 1$).

[5] The mixed layer silicate according to the item [1], characterized by having a regularly mixed layer structure in which the order of lamination of the 2:1 type layered silicate layers (A) having a layer charge of 0.2 to 0.6 and the 2:1 type layered silicate layers (B) having a layer charge of 0 is of 1:1 regular type, i.e.-ABABA- or of 1:2 regular type, i.e., -AABAAB- or -BBABBA-.

[6] A mixed layer silicate having a regularly mixed layer structure including 2:1 type layered silicate layers (A) having a layer charge of 0.2 to 0.6 and 2:1 type layered silicate layers (C) having a layer charge of 0.6 to 1.0 and including potassium ions as interlayer cations.

[7] The mixed layer silicate having a regularly mixed layer structure according to the item [6], characterized in that the basic structure of the 2:1 type layered silicate layer (C) having a layer charge of 0.6 to 1.0 is a mica layer represented by General formula (4):

$$[(K_iM^5{}_{0.1-j})(M^6{}_kM^7{}_l)(Si_{4-m}Al_m)O_{10}(OH)_2]$$ [Chemical formula 4]

(where $0.6 \leq i \leq 1.0$, $0 \leq j \leq 0.1$, $0 < k \leq 3$, $0 < l \leq 2$, $2 \leq k+l \leq 3$, and $0 \leq m < 4$ are satisfied, $M^5$ represents a cation which is present between layers and which is at least one of Li, Na, Rb, Cs, NH$_4$, Be, Mg, Ca, Sr, Ba, Mn, Fe, Ni, Cu, Zn, and Al other than K, $M^6$ and $M^7$ represent metals which enter octahedrons formed in 2:1 type layered silicate layers, $M^6$ represents at least one of Mg, Fe, Mn, Ni, Zn, and Li, and $M^7$ represents at least one of Al, Fe, Mn, and Cr).

[8] The mixed layer silicate according to the item [5], characterized by having a regularly mixed layer structure in which the order of lamination of the 2:1 type layered silicate layers (A) having a layer charge of 0.2 to 0.6 and the 2:1 type layered silicate layers (C) having a layer charge of 0.6 to 1.0 is of 1:1 regular type, i.e.-ACACA- or of 1:2 regular type, i.e., -AACAAC- or -CCACCA-.

[9] A process for producing a mixed layer silicate, characterized by including the steps of mixing silicon, an oxide of aluminum and/or magnesium, and a carbonate of an alkali metal or an alkaline earth metal at a predetermined ratio required of a 2:1 type layered silicate layer (A) represented by Formula (1) and having a layer charge of 0.2 to 0.6 and a 2:1 type layered silicate layer (B) represented by any one of Formula (2) and Formula (3) and having a layer charge of 0 for forming a regularly mixed layer structure based on the combination according to the item [5] so as to prepare molten glass, and subjecting a mixture of the resulting glass composition and water to a hydrothermal reaction at a temperature of 80° C. to 500° C.

[10] A process for producing a mixed layer silicate having a regularly mixed layer structure, the process characterized by including the steps of preparing a composite hydrous oxide with a predetermined formulation required of a 2:1 type layered silicate layer (A) represented by Formula (1) and having a layer charge of 0.2 to 0.6 and a 2:1 type layered silicate layer (B) represented by any one of Formula (2) and Formula (3) and having a layer charge of 0 for forming a mixed layer silicate based on the combination according to the item [5], and subjecting the resulting composite hydrous oxide to a hydrothermal reaction at a temperature of 80° C. to 500° C.

[11] The process for producing a mixed layer silicate according to the item [10], the process characterized in that the above-described composite hydrous oxide is obtained by mixing silicic acid, an aluminum salt and/or a magnesium salt, mixing an alkali aqueous solution containing an alkali metal or an alkaline earth metal so as to form precipitates, and conducting recovery and cleaning so as to remove by-product salts.

[12] The process for producing a mixed layer silicate having a regularly mixed layer structure according to the item [10], the process characterized in that the above-described composite hydrous oxide is obtained by mixing an alkali aqueous solution containing sodium silicate and sodium aluminate and an acidic aqueous solution containing an aluminum salt and/or a magnesium salt so as to form precipitates, and conducting recovery and cleaning so as to remove by-product salts.

[13] The process for producing a mixed layer silicate having a regularly mixed layer structure according to the item [10], the process characterized in that the above-described composite hydrous oxide is obtained by mixing alkoxide containing silicon and an acidic aqueous solution containing an aluminum salt and/or a magnesium salt so as to form precipitates, and conducting recovery and cleaning so as to remove by-product salts.

[14] The process for producing a mixed layer silicate having a regularly mixed layer structure according to the item [10], the process characterized in that the above-described composite hydrous oxide is obtained by mixing an acidic aqueous solution in which metal aluminum and/or metal magnesium is dissolved with an acid, mixing an alkali aqueous solution containing an alkali metal or an alkaline earth metal so as to form precipitates, and conducting recovery and cleaning so as to remove by-product salts.

[15] An organic-inorganic composite material characterized by being produced through intercalation of a positive charge organic compound into the 2:1 type layered silicate layers (A) in the mixed layer silicate having a regularly mixed layer structure according to the above-described item [1] or the item [6].

[16] The organic-inorganic composite material according to the item [15], characterized in that the above-described positive charge organic compound is a primary amine, a secondary amine, or a tertiary amine having the carbon number of 8 or more, and 50 or less, a chloride thereof, a quaternary ammonium salt, an amine compound, an amino acid derivative, a nitrogen-containing heterocyclic compound, or a chloride thereof.

[17] A polymer composite material characterized in that 0.1 to 40 percent by mass of the organic-inorganic composite material according to the above-described item [1,5] is contained in a polymer material.

[18] The polymer composite material according to the item [17] characterized in that the above-described organic-inorganic composite material is homogeneously dispersed in the polymer material in such a way that the average distance between individual particles in which 2 to 3 layers of mixed layer silicate are laminated becomes 3.0 nm or more.

Advantages

The present invention has succeeded in synthesizing the mixed layer silicate having a uniform regularly mixed layer structure including non-swelling layers and swelling layers of 2:1 type layered silicate as constituent layers by a hydrothermal reaction at a temperature range of 80° C. to 500° C. The regularly mixed layer silicate can be homogeneously produced under a wide synthesis condition, while it has been believed that the regularly mixed layer silicate can be produced artificially only under a very narrow synthesis condition.

Furthermore, it becomes thereby possible to control the order of lamination. Moreover, a new polymer nanocomposite in which silicate layer sets, each set including a few silicate layers, are homogeneously dispersed can be obtained by using the mixed layer silicate, whereas in a known polymer nanocomposite, the silicate layers are peeled and dispersed on a one-by-one basis.

BEST MODES FOR CARRYING OUT THE INVENTION

The present invention will be described below in detail. In the present invention, a 2:1 type layered silicate (A) having a layer charge of 0.2 to 0.6 is a smectite layer represented by General formula (1).

[Chemical formula 5]

$$E_a[(M^1{}_bM^2{}_c)(Si_{4-d}Al_d)O_{10}(OH)_2]$$

In the formula, $M^1$ and $M^2$ represent metal elements which enter octahedrons formed in a smectite structure, $M^1$ represents at least one of magnesium, iron, manganese, nickel, zinc, copper, cobalt, and lithium, $M^2$ represents at least one of aluminum, iron, manganese, and chromium, Si and Al in $(Si_{4-d}Al_d)$ are elements constituting a tetrahedral sheet and having the coordination number of 4, and OH is present as an anion in the tetrahedral sheet. E represents an interlayer exchangeable cation selected from the group consisting of an alkali metal ion, an alkaline earth metal ion, a divalent heavy metal ion, a trivarent metal ion, an ammonium ion, and a hydrogen ion, and $0.2 \leq a \leq 0.6$, $0 < b \leq 3$, $0 < c \leq 2$, $0 < 2b+3c \leq 6$, and $0 \leq d < 4$ are satisfied.

Exchangeable cations are substituted between the layers in such a way as to keep a charge balance relative to the negative charge held by the silicate sheet. Therefore, the amount of the above-described layer charge can be indicated by the coefficient a of the above-described chemical formula, that is, a so-called charge number (charge density) per half unit cell. In the present invention, those within the range of $0.2 \leq a \leq 0.6$ are applied. Specific examples of layered silicates which fall within the range of $0.2 \leq a \leq 0.6$ include di-octahedral smectite typified by montmorillonite, beidellite, and nontronite and tri-octahedral smectite typified by saponite, hectorite, and stevensite.

Examples of methods applicable to actual measurement of the amount of interlayer ions of smectite include methods for measuring cation exchange capacity (CEC) applied to swelling clay minerals: a column permeation method (refer to "Nendo Handobukku (Clay Handbook)" second edition, edited by the Clay Science Society of Japan, pages 576-577, GIHODO SHUPPAN) and a methylene blue adsorption method (Japan Bentonite Manufacturers Association Standard, JBAS-107-91), and the like. Alternatively, a method of estimation based on the chemical composition analysis is applied. Specifically, inductively coupled plasma emission spectrometry (ICP), X-ray fluorescence analysis (XRF), electron probe X-ray microanalyzer (EPMA), and the like are used.

A 2:1 type layered silicate layer (B) having a layer charge of 0 is a tri-octahedral talc-like structural portion represented by General formula (2) in the present invention.

$(Mg_{3-e}M^3_e)(Si_{4-f}Al_f)O_{10}(OH)_2$   [Chemical formula 6]

In the formula, $(Mg_{3-e}M^3_e)$ is a cation constituting an octahedral sheet and having the coordination number of 6, and $M^3$ is selected from elements of Fe, Al, Mn, Cr, Ni, Zn, Co, Ti, Ca, Na, and K. In the formula, $(Si_{4-f}Al_f)$ is a cation constituting a tetrahedral sheet and having the coordination number of 4, OH is present as an anion in the octahedral sheet, and e and f represent numbers satisfying the relationships represented by $0 \leq e \leq 2$ and $0 \leq f \leq 1$. The features of talc are that the layer charge is 0 or very close to 0, nothing is present between the layers, and oxygen in the bottom surface is bonded to each other with a van der Waals force. The bottom surface distance is 0.92 to 0.93 nm.

A 2:1 type layered silicate layer (B) having a layer charge of 0 is a di-octahedral pyrophillite-like structural portion represented by General formula (3) in the present invention.

$(Al_{2-g}M^4_g)(Si_{4-h}Al_h)O_{10}(OH)_2$   [Chemical formula 7]

In the formula, $(Al_{2-g}M^4_g)$ is a cation constituting an octahedral sheet and having the coordination number of 6, $M^4$ is selected from elements of $Fe^{2+}$, $Fe^{3+}$, Mg, and Ti, and g and h represent numbers satisfying the relationships represented by $0 \leq g \leq 1$ and $0 \leq h \leq 1$. The structure is similar to the structure of pyrophillite.

The mixed layer structure of the smectite structure portion and the talc-like structure portion in the present invention refers to a structure in which constituent layers of the 2:1 type layered silicate layers (A) having a layer charge of 0.2 to 0.6 and the 2:1 type layered silicate layers (B) having a layer charge of 0 are regularly aligned in a lamination direction. Specifically, it is a feature that there are a 1-1 regularly mixed layer structure in which the constituent layers (A) and the constituent layers (B) are alternately aligned on a one-by-one basis, i.e. in the order of ABABA, and a 1-2 regularly mixed layer structure in which the constituent layers (A) and the constituent layers (B) are aligned in such a way that one layer (A) and two layers (B) or two layers (A) and one layer (B) is repeated, i.e. ABB is repeated or AAB is repeated.

In the present invention, a mixed layer silicate having a desired mixed layer structure can be obtained by setting the numbers of a, b, c, d, e, f, g, and h in General formulae (1), (2), and (3) and the ratio of raw materials based on the lamination structure of the smectite layer and the talc-like layer or the ratio of raw materials based on the lamination structure of the smectite layer and the pyrophillite-like layer.

A 2:1 type layered silicate layer (C) having a layer charge of 0.6 to 1.0 is a mica layer structure represented by General formula (4) in the present invention.

$[(K_iM^5_{0.1-j})(M^6_kM^7_l)(Si_{4-m}Al_m)O_{10}(OH)_2]$   [Chemical formula 8]

In the formula, $0.6 \leq i \leq 1.0$, $0 \leq j \leq 0.1$, $0 < k \leq 3$, $0 < l \leq 2$, $2 \leq k+l \leq 3$, and $0 \leq m < 4$ are satisfied, $M^5$ represents a cation which is present between layers and which is at least one of Li, Na, Rb, Cs, $NH_4$, Be, Mg, Ca, Sr, Ba, Mn, Fe, Ni, Cu, Zn, and Al other than K, $M^6$ and $M^7$ represent metals which enter octahedrons formed in 2:1 type layered silicate layers, $M^6$ represents at least one of Mg, Fe, Mn, Ni, Zn, and Li, and $M^7$ represents at least one of Al, Fe, Mn, and Cr.

The mixed layer structure of the smectite structure portion and the mica structure portion in the present invention refers to a structure in which constituent layers of the 2:1 type layered silicate layers (A) having a layer charge of 0.2 to 0.6 and the 2:1 type layered silicate layers (C) having a layer charge of 0.6 to 1.0 and including potassium ions as interlayer cations are regularly aligned in a lamination direction. Specifically, it is a feature that there are a 1-1 regularly mixed layer structure in which the constituent layers (A) and the constituent layers (C) are alternately aligned on a one-by-one basis, i.e. in the order of ACACA, and a 1-2 regularly mixed layer structure in which the constituent layers (A) and the constituent layers (C) are aligned in such a way that one layer (A) and two layers (C) or two layers (A) and one layer (C) is repeated, i.e. ACC is repeated or AAC is repeated.

Regarding the mixed layer silicate composed of the smectite layer and the mica layer in the present invention, a mixed layer silicate having a desired mixed layer structure can be obtained by setting the numbers of a, b, c, d, i, j, k, and l in General formulae (1) and (4) and the ratio of raw material composition based on the lamination structure of the smectite layer and the mica layer.

A process for producing the mixed layer silicate according to the present invention is not specifically limited, insofar as the mixed layer silicate having the above-described properties is produced. However, a desired mixed layer silicate can be produced efficiently by following the method according to the present invention, as described below.

In a process according to the present invention, composite glass or composite hydrous oxide containing at least silicon, magnesium, and if necessary, aluminum and having a composition of an aimed mixed layer silicate is prepared. Regarding a process for producing this glass composition, a process in which oxides or carbonates having any composition containing at least silicon, magnesium, and if necessary, aluminum are mixed, heating is conducted until a molten state is reached and, thereafter, quenching is conducted so as to obtain glass can be adopted. In this case, the resulting glass is ground, water is added, and the resulting mixture is subjected to a hydrothermal reaction treatment.

Examples of favorable processes usable for producing composite hydrous oxide include (1) a process in which an acidic aqueous solution composed of colloidal silica or silicic acid, a magnesium salt or an aluminum salt, and metal salts necessary for the composition of the aimed mixed layer silicate and an alkali aqueous solution are mixed so as to form precipitates, recovery is conducted by filtration or the like, and cleaning is conducted sufficiently so as to remove by-product salts, (2) a process in which an aqueous solution containing sodium silicate, sodium aluminate, and the like and an acidic aqueous solution containing a magnesium salt or an aluminum salt and metal salts necessary for the composition of the aimed mixed layer silicate are mixed so as to form precipitates of coprecipitation gel, and the same treatment as in the above-described item (1) is conducted, (3) a process in which an acidic aqueous solution containing silicon, metal alkoxide of aluminum or the like, and metal salts necessary for the composition of the aimed mixed layer silicate and an alkali aqueous solution are mixed so as to form precipitates of coprecipitation gel, and the same treatment as in the above-described item (1) is conducted, and (4) a process in which an acidic aqueous solution prepared by dissolving metal aluminum and/or metal magnesium into an acid is blended with metal salts necessary for the composition of the aimed mixed layer silicate, an alkali aqueous solution is mixed therewith so as to form precipitates of coprecipitation gel, and the same treatment as in the above-described item (1) is conducted.

Examples of the above-described alkali aqueous solution can include ammonia, sodium hydroxide, and potassium hydroxide. Regarding the amount of addition of alkali, it is preferable that the slurry pH after addition becomes 8 or more.

It is favorable that aging is conducted after the formation of precipitates of the coprecipitation gel. Specifically, the aging refers to standing of a solution after addition of the alkali at a temperature of 50° C. or higher for 1 hour or more. More preferably, the aging temperature is 70° C. to 100° C., and it is enough that the aging time is 10 hours or less.

The reason for the aging is believed to be that the surface area of coprecipitation gel is reduced, filtration and water washing become easy (reduction in process time), the amount of sodium ions taken into the gel is reduced and, thereby, a chemical composition (for example, Si:Mg ratio) of a product and other various properties are stabilized. However, such expectations do not constrain the present invention.

Subsequently, excess water-soluble by-product salts adhered to the thus obtained coprecipitation gel are removed by conducting filtration and water washing. Examples of water-soluble by-product salts include sodium ions, ammonium ions, nitrate ions, and sulfate ions.

A mixture of the glass obtained by the above-described process and an appropriate amount, e.g., about 5 percent by mass to 80 percent by mass, of water or the composite hydrous oxide is charged into an autoclave, and a hydrothermal reaction is conducted at a temperature of 80° C. to 500° C. A more favorable temperature range is 200° C. to 400° C. It is favorable that the reaction is conducted for 1 hour or more, and preferably 4 hours or more. This hydrothermal reaction proceeds under an autogenous pressure. However, the reaction may be conducted in an appropriately pressurized state. Agitation is not required during the reaction. However, no problem occurs even if agitation is conducted. In general, the reaction rate increases as the reaction temperature becomes higher. Furthermore, the crystallinity of the resulting mixed layer silicate becomes better as the reaction time increases.

After the hydrothermal reaction is completed, the reaction product is taken out of the autoclave, and is washed with water, if necessary. Thereafter, a drying treatment is conducted. This drying treatment is not specifically limited. Heat-drying may be conducted by using a common drier or a vacuum drier at a temperature of, preferably, 60° C. or higher. Spray-drying or freeze-drying may be conducted. After the drying treatment, a grinding treatment may be conducted, if necessary. If the spray-drying is adopted, the grinding treatment is not required.

In this manner, the mixed layer silicate according to the present invention is obtained. The product can be evaluated on the basis of, for example, X-ray diffraction, a differential thermal analysis, an infrared absorption spectrum, a chemical analysis, a cation exchange capacity, viscosity characteristics of a dispersion aqueous solution, pore characteristics, and the like.

The organic-inorganic compound according to the present invention is obtained by intercalating a positive charge organic compound into the 2:1 type layered silicate layers (A) having a swelling property in the mixed layer silicate. The type of positive charge organic compound to be used for the present invention is not specifically limited. Preferable examples thereof include primary amines, secondary amines, and tertiary amines having the carbon number of 8 or more, and 50 or less, chlorides thereof, quaternary ammonium salts, amine compounds, amino acid derivatives, nitrogen-containing heterocyclic compounds, and phosphonium salts. If the carbon number of the positive charge organic compound is less than 8, hydrophobing of the mixed layer silicate becomes unsatisfactory and, therefore, a homogeneous dispersion state in a polymer may not be obtained. If the carbon number exceeds 50, in the case where the chemical affinity with the polymer material is insufficient, for example, bleedout of a molded product may occur.

Specific examples thereof include primary amines typified by octylamine, laurylamine, tetradecylamine, hexadecylamine, stearylamine, oleylamine, acrylamine, benzylamine, and aniline; secondary amines typified by dilaurylamine, ditetradecylamine, dihexadecylamine, distearylamine, and N-methylaniline; tertiary amines typified by dimethyloctylamine, dimethyldecylamine, dimethyllaurylamine, dimethylmyristylamine, dimethylpalmitylamine, dimethylstearylamine, dilaurylmonomethylamine, tributylamine, trioctylamine, and N,N-dimethylaniline; and quaternary ammonium, e.g., tetrabutylammonium ion, tetrahexylammonium ion, dihexyldimethylammonium ion, dioctyldimethylammonium ion, hexatrimethylammonium ion, octatrimethylammonium ion, dodecyltrimethylammonium ion, hexadecyltrimethylammonium ion, stearyltrimethylammonium ion, docosenyltrimethylammonium ion, cetyltrimethylammonium ion, cetyltriethylammonium ion, hexadecylammonium ion, tetradecyldimethylbenzylammonium ion, stearyldimethylbenzylammonium ion, dioleyldimethylammonium ion, N-methyldiethanollaurylammonium ion, dipropanolmonomethyllaurylammonium ion, dimethylmonoethanollaurylammonium ion, polyoxyethylenedodecylmonomethylammonium ion, and quaternized alkylaminopropylamine. Furthermore, examples thereof include amino acid derivatives, e.g., leucine, cysteine, phenylalanine, tyrosine, aspartic acid, glutamic acid, lysine, 6-aminohexylcarboxylic acid, 12-aminolaurylcarboxylic acid, N,N-dimethyl-6-aminohexylcarboxylic acid, N-n-dodecyl-N,N-dimethyl10-aminodecylcarboxylic acid, and dimethyl-N-12-aminolaurylcarboxylic acid; and nitrogen-containing heterocyclic compounds, e.g., pyridine, pyrimidine, pyrrole, imidazole, proline, γ-lactam, histidine, tryptophan, and melamine; and chlorides thereof.

Preferably, the amount of the positive charge organic compound contained in the organic-inorganic composite material according to the present invention is 0.6 to 5 equivalents relative to the amount of interlayer cations of the layered silicate, and in particular, 0.8 to 2.0 equivalents are most preferable. Here, the object of the content of the positive charge organic compound includes not only positive charge organic compounds which conducts ion exchange with interlayer K ions, but also positive charge organic compounds which are physically adsorbed to the surface of the organic-inorganic composite material. Therefore, the content is a total amount of organic materials estimated on the basis of a thermogravimetric measurement and the like. If the amount of the positive charge organic compound in the organic-inorganic composite material becomes less than 0.6 equivalents relative to the amount of the interlayer cations, the dispersibility of the organic-inorganic composite material into the polymer material may be impaired. If the amount exceeds 5 equivalents, the heat resistance of the polymer composite material may be deteriorated because of excess positive charge organic compounds.

The above-described organic-inorganic composite material according to the present invention is used as a filler of a polymer composite material, the filler being dispersed into a polymer material. The content of the organic-inorganic composite material in the polymer material is 0.1 to 40 percent by mass, and preferably within the range of 1.0 to 10 percent by mass. If the content is less than 0.1 percent by mass, a satisfactory effect of enhancing the polymer material is not exerted. If the content exceeds 40 percent by weight, the dispersibility of the organic-inorganic composite material may be impaired.

The polymer composite material according to the present invention has a feature that merely the swelling layers modified by the positive charge organic compound in the mixed layer silicate are peeled at a distance of 3.0 nm or more, and non-swelling layer sets, each set including a few layers laminated, are dispersed in a polymer matrix. In that state, preferably, the distance of peeling is 6.0 nm or more so as to disperse. If the distance between the layers is less than 3.0 nm, a good dispersion state cannot be obtained and, therefore, effects of improving the dynamic properties and the like of the material become unsatisfactory.

Examples of polymer materials constituting the polymer composite materials according to the present invention include thermosetting polymer materials, energy line curable polymer materials, and thermoplastic polymer materials. However, any polymer material is employed, and the polymer material is not specifically limited.

The thermosetting polymer materials used for the present invention are so-called thermosetting resins. Specific examples thereof include urethane resins, unsaturated polyester resins, epoxy resins, phenol resins, silicone resins, melamine derivatives (for example, hexamethoxymelamine, hexabutoxylated melamine, and condensed hexamethoxymelamine), urea compounds (for example, dimethylol urea), bisphenol A compounds (for example, tetramethylol-.bisphenol A), oxazoline compounds, and oxetane compounds. These thermosetting resins can be used alone or at least two types can be used in combination. These thermosetting polymer materials include oligomers before they are cured. That is, the thermosetting polymer material according to the present invention is a generic name for the materials before curing and after curing.

Preferably, the thermosetting polymer material according to the present invention is an epoxy resin. Specific examples of epoxy resins include bisphenol A epoxy resins, hydrogenated bisphenol A epoxy resins, brominated bisphenol A epoxy resins, bisphenol F epoxy resins, novolac epoxy resins, phenol novolac epoxy resins, cresol novolac epoxy resins, N-glycidyl epoxy resins, novolac epoxy resins of bisphenol A, chelate epoxy resins, glyoxal epoxy resins, amino-containing epoxy resins, rubber-modified epoxy resins, dicyclopentadienephenolic epoxy resins, silicone-modified epoxy resins, and ε-caprolactone-modified epoxy resins, which are epoxy compounds having at least one epoxy group in the molecule.

In order to provide flame retardancy, substances having structures in which halogen, e.g., chlorine or bromine, or an atom, e.g., phosphorus, is contained so as to become in a bonding state not easily decomposed by heat or water may be used. Furthermore, bisphenol S epoxy resins, diglycidyl phthalate resins, heterocyclic epoxy resins, bixylenol epoxy resins, biphenyl epoxy resins, and tetraglycidylxylenoylethane resins may be used. These epoxy resins can be used alone or at least two types can be used in combination.

Two-part liquid mixture type cast polymer material, which is composed of a base compound containing uncured oligomer component, e.g., an epoxy resin, an urethane resin (including urethane rubber), or a silicone resin, and a curing agent containing a component for curing the uncured oligomer component, and an adhesive or a paint can also constitute the polymer composite material according to the present invention. In this case, the organic-inorganic composite material is blended into at least one of the base compound and the curing agent, and the polymer composite material according to the present invention can be obtained by mixing the base compound and the curing agent and conducting thermosetting treatment.

The energy line curable polymer material according to the present invention is a polymer material which is cured by an active energy line, e.g., visible light, an ultraviolet ray, an electron beam, a gamma ray, or an X ray, and is a generic name for polymer materials in a photosensitive prepolymer state before curing and polymer materials after curing. It is preferable that the photosensitive prepolymer used for the present invention has an ethylenic unsaturated terminal groups derived from an acrylic monomer.

Here, the acrylic monomer is acrylic acid or methacrylic acid (hereafter acrylic acid and methacrylic acid are collectively called "(meth)acrylic acid") or a derivative thereof, e.g., an alkyl ester or a hydroxyalkyl ester. Examples of such photosensitive prepolymers include polyester (meth)acrylate, epoxy (meth)acrylate, urethane (meth)acrylate, polybutadiene (meth)acrylate, silicone (meth)acrylate, and melamine (meth)acrylate. Most of all, epoxy (meth)acrylate and urethane (meth)acrylate are preferable.

In general, these energy line curable polymer materials are often used together with photopolymerization initiators. Examples of photopolymerization initiators can include benzophenones, e.g., benzophenone, benzoylbenzoic acid, 4-phenylbenzophenone, hydroxybenzophenone, and 4,4'-bis (diethylamino)benzophenone; benzoin alkyl ethers, e.g., benzoin, benzoin ethyl ether, benzoin isopropyl ether, benzoin butyl ether, and benzoin isobutyl ether; acetophenones, e.g., 4-phenoxydichloroacetophenone, 4-t-butyl-dichloroacetophenone, 4-t-butyl-trichloroacetophenone, diethoxyacetophenone, and 2-benzyl-2-dimethylamino-1-(4-morpholinophenyl)-butanone-1; thioxanthenes, e.g., thioxanthene, 2-chlorothioxanthene, 2-methylthioxanthene, and 2,4-dimethylthioxanthene; alkylanthraquinones, e.g., ethylanthraquinone and butylanthraquinone; and acylphosphine oxides, e.g., 2,4,6-trimethylbenzoyldiphenylphosphine oxide. They can be used alone or as a mixture of at least two types. Furthermore, a photosensitizer can be used in combination, if necessary.

Examples of thermoplastic polymer materials to be used for the present invention include polyolefin resins, e.g., high density polyethylene, low density polyethylene, linear low density polyethylene, polypropylene, ethylene-propylene copolymer, ethylene-butene copolymer, ethylene-hexene copolymer, ethylene-vinyl acetate copolymer, ethylene-methacrylate copolymer, and ionomer resin; styrene, acrylonitrile resins, e.g., polystyrene, styrene-acrylonitrile copolymer, styrene-acrylonitrile-butadiene copolymer, polyacrylonitrile, and styrene-ethylene-butene ternary copolymer; halogen-containing resins, e.g., polyvinyl chloride, polyvinylidene chloride, and polyvinylidene fluoride; polyamide resins and copolymers thereof, e.g., polycarbonate, polyacetal, polyamide 6, polyamide 66, polyamide 11, polyamide 12, aromatic polyamide, and polymethacrylic imide; polyester resins, e.g., polyethylene terephthalate, polybutylene terephthalate, polyethylene naphthalate, aliphatic polyester, and aromatic polyester; polyphenylene ether; polyphenylene sulfide; polysulfone resin; and biodegradable resins, e.g., polylactic acid, biodegradable aliphatic polyester, and polycaprolactone. They may be used alone or at least two types may be combined into polymer alloys. Furthermore, other fibrous, wisker-like, or spherical inorganic fillers may be contained.

Regarding the process for mixing the organic-inorganic composite material according to the present invention with the thermosetting polymer or the energy line curable polymer, specifically, it is possible that the above-described individual components are mixed and, thereafter, melt-kneading is conducted. For example, production can be conducted through melt-kneading by using a known kneading method, e.g., Banbury mixer, Brabender, kneader, roll, uniaxial or multiaxial extruder, or Ko-Kneader. Regarding an uncured polymer composite material diluted with a solvent or the like so as to reduce the viscosity at room temperature to the ink-like state, production can also be conducted by a known kneading method, e.g., a triple roller mill or a beads mill.

Regarding the process for melt-kneading the organic-inorganic composite material according to the present invention with the thermoplastic polymer, preferably, the above-described individual components are mixed and, thereafter, melt-kneading is conducted. For example, production can be conducted through melt-kneading by using a known kneading method, e.g., Banbury mixer, Brabender, kneader, roll, uniaxial or multiaxial extruder, or Ko-Kneader.

The present invention will be described below with reference to examples. However, the present invention is not limited to these examples.

[Evaluation of Mixed Layer Silicate]

The synthesized product was applied on a glass substrate, the resulting substrate was put into an enclosed container in which ethylene glycol (EG) was present as a lower layer, and was subjected to a treatment of exposure to the EG vapor at 60° C. for 1 day. The sample before and after the treatment was subjected to an X-ray diffraction measurement (Fe—Kα ray), and the lamination structure of the mixed layer silicate was evaluated on the basis of changes in bottom surface reflection. Two molecules of intercalation of EG molecules into the smectite layer occurs so that swelling is effected. Regarding a single smectite layer, in general, EG molecules are intercalated between layers, and the bottom surface distance becomes about 1.7 nm.

EXAMPLE 1

After weighing 1.59 g of sodium carbonate ($Na_2CO_3$ anhydride 99.98%, ASAHI GLASS CO., LTD.), 11.49 g of magnesium oxide (MgO 99.99%, UBE INDUSTRIES, LTD.), and 24.03 g of silicon oxide ($SiO_2$(VI) 99.99%, Kojundo Chemical Laboratory Co., Ltd.) (mole ratio 0.3 $Na_2CO_3$:5.7 MgO:8 $SiO_2$), mixing and grinding were conducted in an automatic mortar. The resulting mixture was melted in an electric furnace at 1,700° C., followed by quenching so as to generate glass. The resulting glass compound and water were mixed at a ratio of 1:1 (mass ratio) and encapsulated into a gold tube. Subsequently, a hydrothermal reaction treatment was conducted at 1,000 atm and 350° C. for 7 days.

Figure 1:
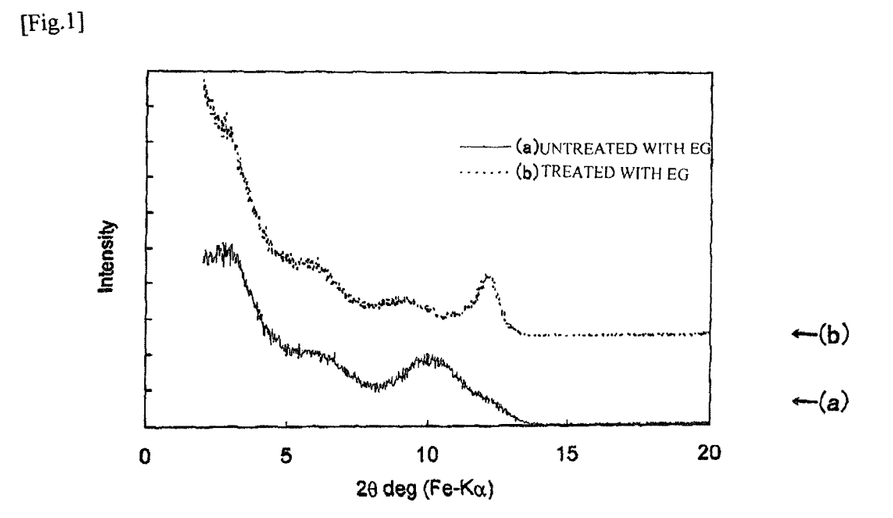
FIG. 1 is a graph showing the results of the XRD measurement of the sample obtained in Example 1.

The reaction product after the treatment was cleaned and filtrated. Thereafter, freeze-drying and grinding were conducted in a mortar so as to obtain a sample. As a result of an XRD measurement, regarding the untreated powder, bottom surface reflection ($d_{001}$=3.6 nm) appeared in the vicinity of $2\theta$=3.1° (FIG. 1 a). On the other hand, regarding the sample after the ethylene glycol (EG) treatment, EG was intercalated into the smectite layer, bottom surface reflection appeared in the vicinity of $2\theta$=2.9°, and $d_{001}$ increased to 3.7 nm (FIG. 1 b). From this, it is believed that a 1-2 regularly mixed layer silicate was obtained, wherein one smectite-like layer and two talc-like layers were laminated alternately.

EXAMPLE 2

A sample was obtained as in Example 1 except that 1.59 g of sodium carbonate ($Na_2CO_3$ anhydride 99.98%, ASAHI GLASS CO., LTD.), 9.43 g of aluminum oxide ($Al_2O_3$ 99.99%, Kojundo Chemical Laboratory Co., Ltd.), and 24.03 g of silicon oxide ($SiO_2$(VI) 99.99%, Kojundo Chemical Laboratory Co., Ltd.) (mole ratio 0.3 $Na_2CO_3$:1.85 $Al_2O_3$:8 $SiO_2$) were used and the conditions of the hydrothermal reaction treatment were 1,000 atm, 450° C., and 10 days.

Figure 2:
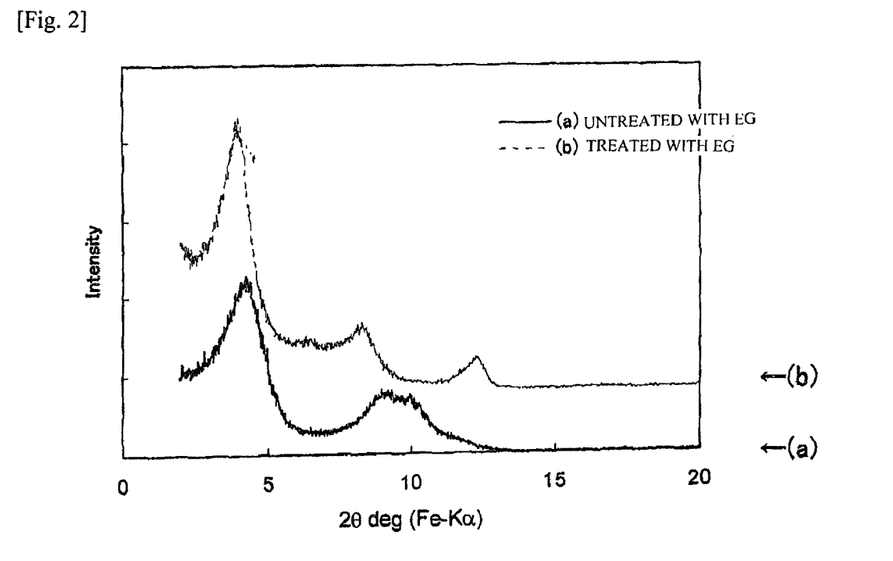
FIG. 2 is a graph showing the results of the XRD measurement of the sample obtained in Example 2.

As a result of an XRD measurement, regarding the untreated powder, bottom surface reflection of $d_{001}$=2.5 nm appeared in the vicinity of $2\theta$=4.4° (FIG. 2 a). On the other hand, regarding the sample after the EG treatment, EG molecules were intercalated into the smectite layer, and the bottom surface distance (reflection in the vicinity of $2\theta$=3.9°) increased to 2.8 nm (FIG. 2 b). From this, it is believed that a 1-1 regularly mixed layer silicate was obtained, wherein smectite layers and mica layers were laminated alternately on a one-by-one basis.

EXAMPLE 3

Melting and quenching of 1.59 g of sodium carbonate ($Na_2CO_3$ anhydride 99.98%, ASAHI GLASS CO., LTD.), 11.73 g of aluminum oxide ($Al_2O_3$ 99.99%, Kojundo Chemical Laboratory Co., Ltd.), and 24.03 g of silicon oxide ($SiO_2$(VI) 99.99%, Kojundo Chemical Laboratory Co., Ltd.) (mole ratio 0.3 $Na_2CO_3$:2.3 $Al_2O_3$:7.4 $SiO_2$) were conducted with an infrared-image furnace at 1,800° C. so as to vitrify. The resulting vitrified mixture was subjected to a hydrothermal reaction treatment at 1,000 atm and 450° C. for 21 days so as to obtain a powder sample.

Figure 3:
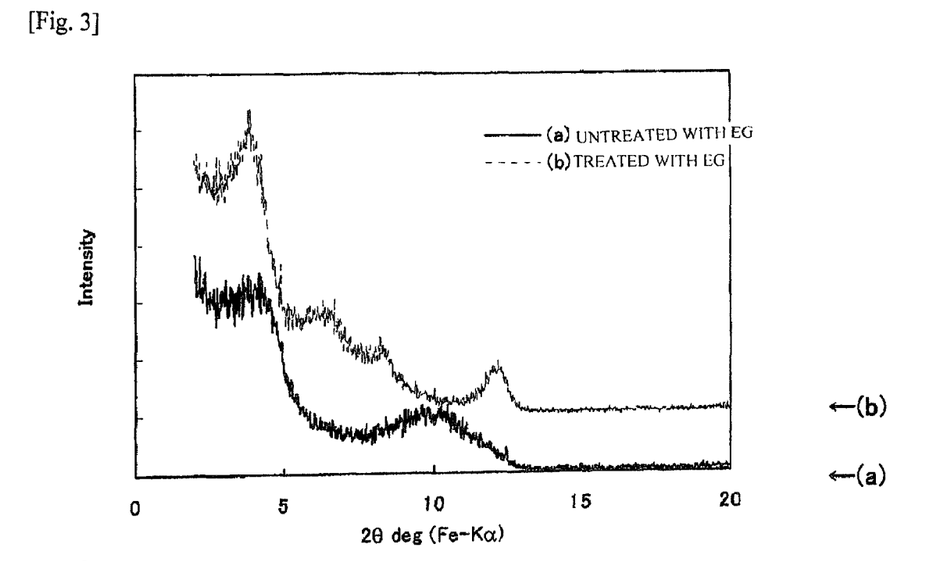
FIG. 3 is a graph showing the results of the XRD measurement of the sample obtained in Example 3.

As a result of an XRD measurement, regarding the untreated powder, bottom surface reflection of $d_{001}$=2.6 nm appeared in the vicinity of $2\theta$=4.3° (FIG. 3 a). On the other hand, regarding the sample after the ethylene glycol treatment, ethylene glycol was intercalated into the smectite layer, and the bottom surface distance (reflection in the vicinity of $2\theta$=3.8°) increased to 2.9 nm (FIG. 3 b). From this, it is believed that a 1-1 regularly mixed layer silicate was obtained, wherein smectite layers and mica layers were laminated alternately on a one-by-one basis.

EXAMPLE 4

Figure 4:
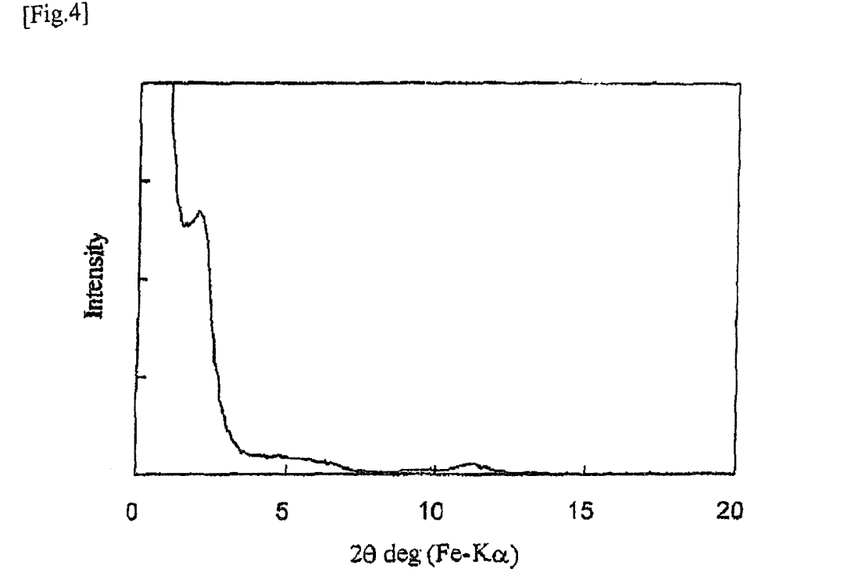
FIG. 4 is a graph showing the results of the XRD measurement of the sample obtained in Example 4.

Octadecylamine hydrochloride (TOKYO KASEI KOGYO CO., LTD.) serving as a positive charge organic compound was dissolved into a pure water/ethanol mixed solution so as to prepare a 0.02-M solution. Thereafter, 0.5 g of 1-2 regularly mixed layer silicate prepared in Example 1 was put into 100 mL of the resulting dodecylamine hydrochloride aqueous solution, agitation was conducted at room temperature for about 3 hours. Filtration and cleaning were repeated, and drying was conducted so as to prepare an organic-inorganic composite material. As a result of an XRD measurement of the resulting sample, regarding the untreated powder, bottom surface reflection ($d_{001}$=3.6 nm) appeared in the vicinity of $2\theta$=3.1° (FIG. 1 a). On the other hand, octadecylamine was intercalated, broad bottom surface reflection appeared in the vicinity of $2\theta$=2.0°, and $d_{001}$ increased to 5.5 nm (FIG. 4).

EXAMPLE 5

The organic-inorganic composite material prepared in Example 4 and bisphenol A epoxy resin Epicoat 828, produced by Japan Epoxy Resin Co., Ltd.) were kneaded with a triple roll mill (DR-35, KANEDA SCIENTIFIC CO., LTD.) so as to prepare a base compound containing 2 percent by mass of organic-inorganic composite material. Thereafter, 80 parts by mass of methylnadic anhydride (Wako Pure Chemical Industries, Ltd.) serving as a curing agent was added relative to 100 parts by mass of epoxy resin in the base component, followed by agitation. Furthermore, 0.02 parts by mass of N,N-dimethylbenzylamine (Aldrich) serving as a curing catalyst was added relative to 100 parts by mass of the entire mixture, followed by agitation again. Subsequently, in order to orient the organic-inorganic composite material, the liquid sample was injected into a mold form of 100 μm thickness and sandwiched by glass plates. A curing treatment was conducted at 180° C. in a compression state.

Figure 5:
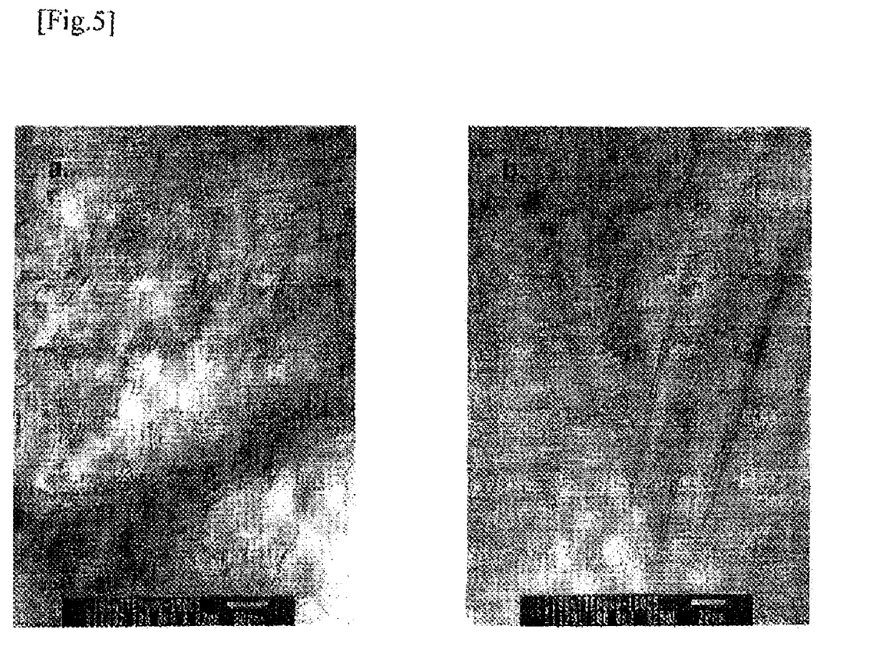
FIG. 5 is a TEM image substituted for a drawing of the sample obtained in Example 5. (a) low magnification image (30,000 times), (2) high magnification image (250,000 times).

A very thin section was prepared from the resulting oriented sample by using an ultramicrotome (ULTRACUT UCT, Leica), and the dispersion state of the organic-inorganic composite material was observed with a transmission electron microscope TEM (JEM1010, JEOL LTD.) at the condition of acceleration voltage of 100 kV. As a result, the state in which silicate layer sets, each set including a few silicate layers of 1 nm thickness, are homogeneously dispersed in the epoxy was ascertained (FIG. 5a, FIG. 5b).

Comparative Example 1

A sample was obtained as in Example 1 except that the temperature was changed to 600° C. in the conditions of the hydrothermal reaction treatment. As a result of an XRD measurement, an intense peak which is not changed depending on the presence or absence of the ethylene glycol treatment was observed at $2\theta$=11°, and sharp peaks were observed at $2\theta$=26° and 54°, so that a mica layer and a quartz phase were ascertained.

INDUSTRIAL APPLICABILITY

The mixed layer silicate according to the present invention is a specific material having a structure in which non-swelling layers and swelling layers are mixed and regularly laminated and have the properties of both layers in combination. Therefore, it is expected that new high-performance materials are created by controlling this mixed layer structure. For example, organic molecules intercalated into swelling layers are sandwiched by at least two silicate layers (non-swelling layer unit), so that an organic-inorganic hybrid material having further excellent heat resistance can be obtained. Therefore, it is possible to use as a host agent of a high-performance organic-inorganic hybrid material, a reinforcement of a polymer material, and the like.

The invention claimed is:

1. A mixed layer silicate comprising a regularly mixed layer structure including 2:1 type layered silicate layers (A) having a layer charge of 0.2 to 0.6 and 2:1 type layered silicate layers (B) having a layer charge of 0.

2. The mixed layer silicate comprising a regularly mixed layer structure according to claim 1, wherein the 2:1 type layered silicate layer (A) is a smectite layer represented by chemical formula (1):

$$E_a[M^1_b M^2_c)(Si_{4-d}Al_d)O_{10}(OH)_2] \qquad \text{(chemical formula (1))}$$

(where in the formula, $M^1$ and $M^2$ represent metal elements which enter octahedrons formed in a smectite structure, $M^1$ represents at least one of magnesium, iron, manganese, nickel, zinc, copper, cobalt, and lithium, $M^2$ represents at least one of aluminum, iron, manganese, and chromium, E represents an interlayer exchangeable cation selected from the group consisting of an alkali metal ion, an alkaline earth metal ion, a divalent heavy metal ion, a trivalent metal ion, an ammonium ion, and a hydrogen ion, and $0.2 \leq a \leq 0.6$, $0 < b \leq 3, 0 < c$ $2, 0 < 2b+3c$ 6, and $0 \leq d \leq 4$ are satisfied).

3. The mixed layer silicate comprising a regularly mixed layer structure according to claim 1, wherein the 2:1 type layered silicate layer (B) having a layer charge of 0 is a talc-like layer represented by chemical formula (2):

$$(Mg_{3-e}M^3_e)(Si_{4-f}Al_f)O_{10}(OH)_2 \qquad \text{(chemical formula (2))}$$

(where in the formula, $M^3$ represents one type of metal element selected from iron, aluminum, manganese, chromium, nickel, zinc, cobalt, titanium, calcium, sodium, and potassium and e and f represent numbers satisfying the relationships represented by $0 \leq e \leq 2$ and $0 \leq f \leq 1$).

4. The mixed layer silicate comprising a regularly mixed layer structure according to claim 1, wherein the 2:1 type layered silicate layer (B) is a pyrophillite-like layer represented by chemical formula (3):

$$(Al_{2-g}M^4_g)(Si_{4-h}Al_h)O_{10}(OH)_2 \qquad \text{(chemical formula (3))}$$

(where in the formula, $M^4$ represents one type of metal element selected from iron, magnesium, and titanium and g and h represent numbers satisfying the relationships represented by $0 \leq g \leq 1$ and $0 \leq h \leq 1$).

5. The mixed layer silicate according to claim 1, characterized by comprising a regularly mixed layer structure in which the order of lamination of the 2:1 type layered silicate layers (A) having a layer charge of 0.2 to 0.6 and the 2:1 type layered silicate layers (B) having a layer charge of 0 is of 1:1 regular type, or of 1:2 regular type.

6. A process for producing a mixed layer silicate according to claim 3 or 4, comprising the steps of:
mixing silicon, an oxide of aluminum and/or magnesium, and a carbonate of an alkali metal or an alkaline earth metal at a predetermined ratio required of a 2:1 type layered silicate layer (A) represented by the chemical formula (1) and a 2:1 type layered silicate layer (B) represented by any one of the chemical formula (2) and (3) for forming a regularly mixed layer structure in which the order of lamination of the 2:1 type layered silicate layers (A) having a layer charge of 0.2 to 0.6 and the 2:1 type layered silicate layers (B) having a layer charge of 0 is of 1:1 regular type, or of 1:2 regular type so as to prepare molten glass, and
subjecting a mixture of the resulting glass composition and water to a hydrothermal reaction at a temperature of 80° C. to 500° C.

7. A process for producing a mixed layer silicate according to claim 3 or 4, comprising the steps of:
preparing a composite hydrous oxide with a predetermined formulation required of a 2:1 type layered silicate layer (A) represented by Formula (1) and having a layer charge of 0.2 to 0.6 and a 2:1 type layered silicate layer (B) represented by any one of Formula (2) and Formula (3) and having a layer charge of 0 for forming a mixed layer silicate in which the order of lamination of the 2:1 type layered silicate layers (A) having a layer charge of 0.2 to 0.6 and the 2:1 type layered silicate layers (B) having a layer charge of 0 is of 1:1 regular type, or of 1:2 regular type, thereby obtaining a resulting composite hydrous oxide, and
subjecting the resulting composite hydrous oxide to a hydrothermal reaction at a temperature of 80° C. to 500° C.

8. The process for producing a mixed layer silicate having a regularly mixed layer structure according to claim 7, wherein the composite hydrous oxide is obtained by mixing silicic acid, an aluminum salt and/or a magnesium salt, mixing an alkali aqueous solution containing an alkali metal or an alkaline earth metal so as to form precipitates, and conducting recovery and cleaning so as to remove by-product salts.

9. The process for producing a mixed layer silicate comprising a regularly mixed layer structure according to claim 7, wherein the composite hydrous oxide is obtained by mixing an alkali aqueous solution containing sodium silicate and sodium aluminate and an acidic aqueous solution containing an aluminum salt and/or a magnesium salt so as to form precipitates, and conducting recovery and cleaning so as to remove by-product salts.

10. The process for producing a mixed layer silicate comprising a regularly mixed layer structure according to claim 7, wherein the composite hydrous oxide is obtained by mixing alkoxide containing silicon and an acidic aqueous solution containing an aluminum salt and/or a magnesium salt so as to form precipitates, and conducting recovery and cleaning so as to remove by-product salts.

11. The process for producing a mixed layer silicate comprising a regularly mixed layer structure according to claim 7, wherein the composite hydrous oxide is obtained by mixing an acidic aqueous solution in which metal aluminum and/or metal magnesium is dissolved with an acid, mixing an alkali aqueous solution containing an alkali metal or an alkaline earth metal so as to form precipitates, and conducting recovery and cleaning so as to remove by-product salts.

12. An organic-inorganic composite material characterized by being produced through intercalation of a positive charge organic compound into the 2:1 type layered silicate layers (A) in the mixed layer silicate having a regularly mixed layer structure according to claim 1.

13. The organic-inorganic composite material according to claim 12, characterized in that the positive charge organic compound comprises a primary amine, a secondary amine, or a tertiary amine having the carbon number of 8 or more, and 50 or less, a chloride thereof, a quaternary ammonium salt, an amine compound, an amino acid derivative, a nitrogen-containing heterocyclic compound, or a chloride thereof.

14. A polymer composite material characterized in that 0.1 to 40 percent by mass of the organic-inorganic composite material according to claim 12 is contained in a polymer material.

15. The polymer composite material according to claim 14 characterized in that the organic-inorganic composite material is homogeneously dispersed in the polymer material in such a way that the average distance between individual particles in which 2 to 3 layers of mixed layer silicate are laminated becomes 3.0 nm or more.

\* \* \* \* \*